United States Patent [19]

Ando et al.

[11] Patent Number: 5,179,450
[45] Date of Patent: Jan. 12, 1993

[54] VIDEO SIGNAL PROCESSING APPARATUS AND METHOD FOR THE TIME BASE COMPENSATION

[75] Inventors: Toshizumi Ando; Hiroyuki Iida, both of Kanagawa, Japan

[73] Assignee: Sony Corporation, Tokyo, Japan

[21] Appl. No.: 623,067

[22] Filed: Dec. 6, 1990

[30] Foreign Application Priority Data

Dec. 15, 1989 [JP] Japan .................. 1-325482

[51] Int. Cl.$^5$ .......................... H04N 9/88; H04N 9/89
[52] U.S. Cl. ................... 358/312; 358/324; 358/314
[58] Field of Search ............... 358/17, 19, 320, 323, 358/324, 326, 325, 312

[56] References Cited

U.S. PATENT DOCUMENTS

| | | | |
|---|---|---|---|
| 4,531,149 | 7/1985 | Lewis, Jr. | 358/326 |
| 4,577,236 | 3/1986 | Takanashi | 358/320 |
| 4,714,965 | 12/1987 | Yoshinaka et al. | 358/320 |
| 4,809,084 | 2/1989 | Morimoto et al. | 358/324 |
| 4,916,548 | 4/1990 | Moridka et al. | 358/320 |

Primary Examiner—Donald McElheny, Jr.
Attorney, Agent, or Firm—Alvin Sinderbrand; William S. Frommer

[57] ABSTRACT

A video signal processing apparatus and method are provided in which time base errors in the luminance and color signals of a video signal reproduced from a recording medium are compensated. Time base errors in the luminance signal are reduced by storing the luminance signal in a first memory in response to a write clock singal synchronized with the video signal and subsequently reading the luminance signal from the memory in response to a first read clock signal synchronized with a stable clock signal. Time base errors in the color signal are reduced by writing the color signal in a second memory in response to the write clock signal and subsequently reading the color signal from the second memory in response to a second read clock signal synchronized with the stable clock signal such that corresponding portions of the luminance signal and the color signal are read from the first and second memories at different respective times with a predetermined time difference therebetween.

15 Claims, 5 Drawing Sheets

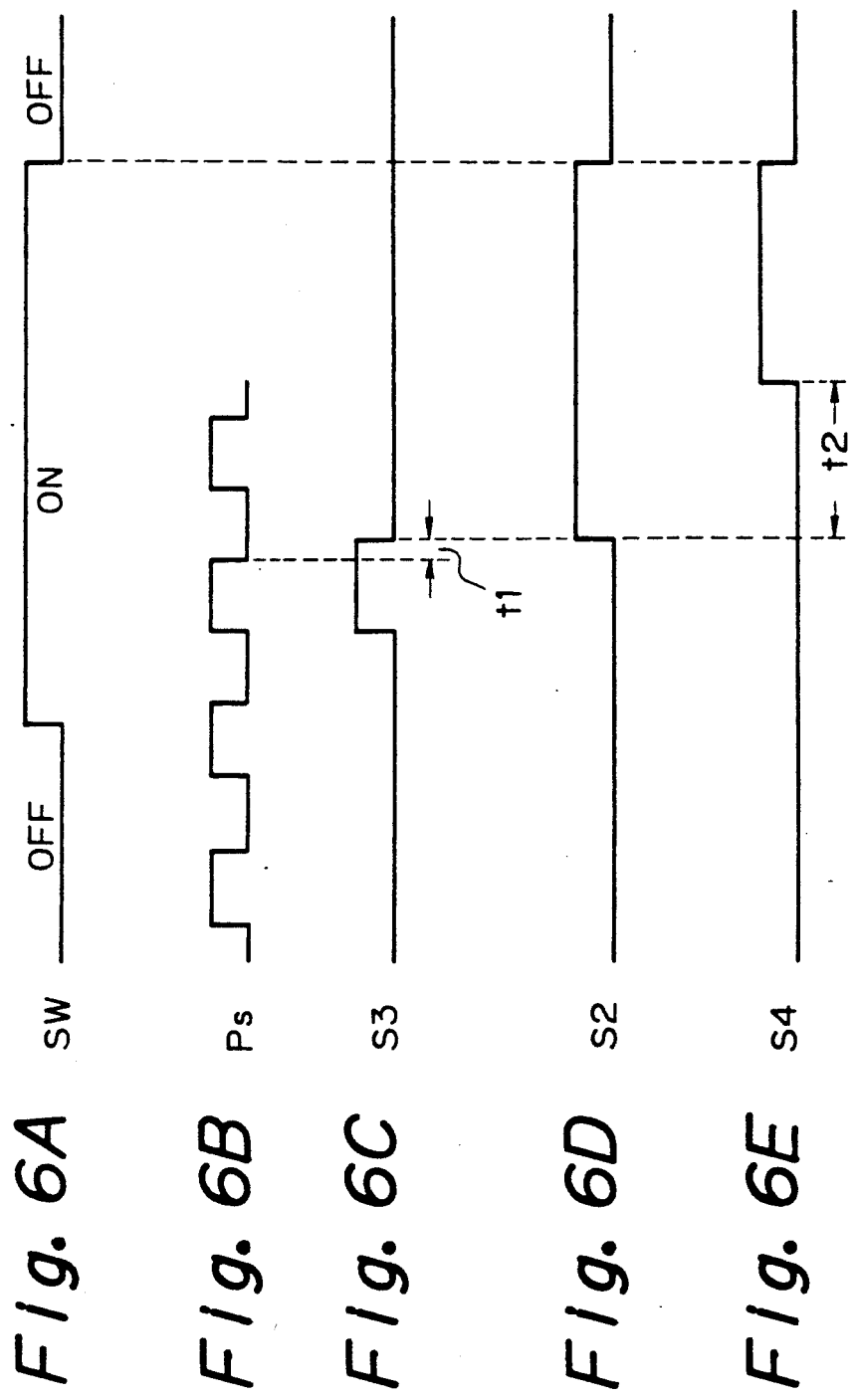

VIDEO SIGNAL PROCESSING APPARATUS AND METHOD FOR THE TIME BASE COMPENSATION

BACKGROUND OF THE INVENTION

The present invention relates to video signal reproducing apparatus and methods for time base compensation of reproduced luminance and color signals.

Existing video tape recorders record and reproduce FM modulated luminance signals and low frequency converted color signals with the use of a rotary magnetic recording/reproducing head. The recording/reproducing head includes a tape guide drum operative to rotate at a frame frequency and a pair of magnetic heads affixed thereto such that they alternately contact a magnetic tape wound obliquely about the circumference of the tape guide drum to effect recording or reproduction of the luminance and color signals.

The existing video tape recorders employ either a phase inversion system or a phase shift system for respectively inverting or shifting the phase of the color signal carrier between adjacent recording tracks to facilitate crosstalk elimination upon signal reproduction. In the reproduction mod,, such crosstalk elimination is accomplished by combining the reproduced low frequency converted color signal with a previously reproduced portion thereof delayed by one horizontal line. Consequently, a delay of one horizontal period is introduced in the reproduced signal which is then compensated by correspondingly delaying the reproduced luminance signal by one horizontal line.

The reproduced luminance and color signals are also subjected to filtering which introduces delays in addition to those created by the crosstalk elimination process. It is, therefore, necessary to adjust the delay times produced by filtering so that a further time difference does not occur between the luminance and color signals. It will be appreciated that the foregoing measures undesirably increase the cost of existing video tape recorders as they require a delay line to compensate for the delay introduced by crosstalk elimination, and by requiring careful adjustment of filtering circuitry so that a time differential is not introduced between the luminance and color signals thereby.

In the reproduction mode of the existing video tape recorder, the level of the reproduced signal is continuously monitored so that when it falls below a predetermined value, it is determined that a dropout has occurred. Upon such determination, a dropout detection signal is produced for use in subsequent processing to replace the portion of the signal in which the dropout has occurred with a vertically corresponding portion of a preceding line of the signal which has been subjected to a one horizontal period delay for this purpose.

Digital time base compensation (TBC) is another signal processing technique carried out in the reproduction mode for the purpose of eliminating time base fluctuation, also referred to as "jitter", in the reproduced video signal. Such time base compensation is carried out by writing the reproduced luminance signal in a memory with the use of a clock signal synchronized with the luminance signal and subsequently reading the stored luminance signal from memory with the use of a stable read clock. A further technique employed in the reproduction mode serves to eliminate noise in the reproduced color signal with the use of a cyclic comb filter which requires vertical correlation of the color signal for effective operation. A similar noise reduction capability is provided for the luminance signal, together with correlation detection for generating a detection signal indicating the presence or absence of vertical correlation in the reproduced luminance signal. Accordingly, in order to avoid deterioration of the color signal due to a lack of correlation thereof, the noise elimination process for the color signal is selectively disabled at such times that the detection signal indicates the absence of vertical correlation.

The reproduced luminance signal and low frequency converted color signal typically possess different time base errors. Therefore, it is preferable to carry out noise elimination after time base compensation to prevent the occurrence of a time shift between the color signal and the correlation detection signal. However, when dropout compensation is carried out after time base compensation, an undesirable time shift is introduced between the time base compensated luminance signal and the dropout detection signal.

It will be appreciated that the magnitude of time base fluctuation which can be corrected by a given time base compensator depends on its memory capacity. That is, when the time base fluctuation becomes too great, the write address outruns the read address of the time base compensator memory, such that certain portions of the video signal are consequently lost. When this occurs, it is typically necessary to re-read a picture previously stored in memory. It is, therefore, preferable to avoid such outrunning and in one known technique for doing so, a control signal is produced by frequency division of the read clock which in turn is used by the drum servo circuitry for controlling the phase of the drum's rotation in order to maintain the average values of the write and read clocks essentially equal.

While the foregoing technique is effective for minimizing outrunning in the time base compensation memories, it will be appreciated that the phase of the drum will not be synchronized with the read clock when the speed of the magnetic tape is varied, for example, in a slow reproduction mode, a cue reproduction mode or a jog mode in which continuous speed control over a range of values is employed for editing purposes. Accordingly, in such non-standard speed modes of operation, the time base compensation circuitry typically is disabled and the read clock is uncoupled from the drum servo system. When the standard playback mode is recommenced and time base compensation then reactivated, the read clock signal is again provided to the drum servo system for stabilizing the write and read clocks. However, when this occurs the phase of the servo reference signal varies discontinuously since the phase of the drum's rotation has been decoupled from the control signal produced by dividing the read clock, and as a consequence, it takes a relatively long time for the drum servo system to lock with the control signal. Therefore, an undesirably long delay is caused between the recommencement of the normal playback mode and the operative state of the time base compensator.

OBJECTS AND SUMMARY OF THE INVENTION

Accordingly, it is an object of the present invention to provide an improved video signal processing apparatus and method for processing reproduced video signals which avoid the above-mentioned disadvantages and problems associated with the prior art.

More specifically, it is an object of the present invention to provide an improved video signal processing apparatus and method which is operative to achieve time base compensation of reproduced luminance and color signals such that a predetermined time difference is introduced therebetween to compensate for differential time delays induced elsewhere in the apparatus.

Another object of the present invention is to provide a video signal processing apparatus and method which permits dropout compensation to be carried out after time base compensation of the reproduced video signal while simultaneously avoiding a time shift between a dropout detection pulse and the reproduced video signal when dropout compensation is performed.

A further object of the present invention is to provide a video signal processing apparatus and method which substantially reduces the time required for a drum servo system to lock with a control signal produced from the read clock of a time base compensator when the latter is reactivated.

In accordance with one aspect of the present invention, a video signal processing apparatus is provided for processing a luminance signal and a color signal of a video signal reproduced from a recording medium, comprising: first time base compensator means for reducing time base errors in the luminance signal to produce a time base compensated luminance signal; the first time base compensator means including first memory means for storing the luminance signal; second time base compensator means for reducing time base errors in the color signal to produce a time base compensated color signal; the second time base compensator means including second memory means for storing the color signal; first clock means for producing a write clock signal synchronized with the video signal; second clock means for producing a read clock signal synchronized with a stable clock signal; and controller means for writing the luminance signal and the color signal into the first memory means and the second memory means, respectively, in response to the write clock signal, and for reading the luminance signal and the color signal from the first memory means and the second memory means in response to the read clock signal, respectively; the controller means being operative to control the reading of the luminance signal and the color signal from the first memory means and the second memory means such that corresponding portions of the luminance signal and the color signal are read therefrom at different respective times with a predetermined time difference therebetween.

In accordance with another aspect of the present invention, a method of processing a video signal reproduced from a recording medium, the video signal including a luminance signal and a color signal, comprises the steps of: reducing time base errors in the luminance signal by storing the luminance signal in a first memory means in response to a write clock signal synchronized with the video signal and subsequently reading the luminance signal from the first memory means in response to a read clock signal synchronized with a stable clock signal; and reducing time base errors in the color signal by writing the color signal in a second memory means in response to the write clock signal and subsequently reading the color signal from the second memory means in response to said read clock signal such that corresponding portions of the luminance signal and the color signal are read from the first and second memory means at different respective times with a predetermined time difference therebetween.

It will be appreciated that the apparatus and method of the present invention in accordance with the foregoing aspects thereof provide an efficient technique for both providing time base compensation and a predetermined delay between the luminance and color signals to compensate for time delays induced elsewhere in the system ancillary to other signal processing.

In accordance with a preferred embodiment of the present invention, time base errors in a dropout signal indicating a dropout of the reproduced video signal are reduced in common with the reduction of time base errors in a respective one of the luminance and color signals, and dropouts in at least one of the time base compensated luminance and color signals are compensated in response to the time base compensated dropout signal. It will be appreciated that in this preferred embodiment, dropout compensation can be advantageously carried out after time base compensation with the use of a time base compensated dropout signal in order to avoid a time shift between the dropout signal and the corresponding signal experiencing the detected dropout.

In accordance with another feature of the preferred embodiment, the video signal is reproduced from a recording medium including a rotary drum operative to produce a drum phase signal indicating a rotational phase of the rotary drum; a stable reference signal synchronized with the stable clock signal is produced, and prior to storing the luminance signal and the color signal in the first and second memory means for time base compensation thereof, the phase of the stable reference signal is adjusted to establish a predetermined relationship thereof with the phase of the drum phase signal. A servo reference signal synchronized with the stable reference signal is produced; and the rotational phase of the rotary drum is controlled so that its drum phase signal coincides with the servo reference signal. It will be seen that the present invention in accordance with this feature of the preferred embodiment enables a stable reference signal to be phase adjusted rapidly with the rotational phase of the rotary drum so that a minimal delay results between the initiation of normal speed reproduction and the commencement of time base compensation.

The above, and other objects, features and advantages of the invention, will be apparent in the following detailed description of a preferred embodiment thereof which is to be read in connection with the accompanying drawings forming a part hereof, and wherein corresponding parts and components are identified by the same reference numerals in the several views of the drawings.

BRIEF DESCRIPTION OF THE DRAWINGS

FIGS. 6A to 6E are a timing chart for use in explaining the operation of the control circuitry and servo system of FIG. 5.

DETAILED DESCRIPTION OF THE PREFERRED EMBODIMENT

Figure 1:
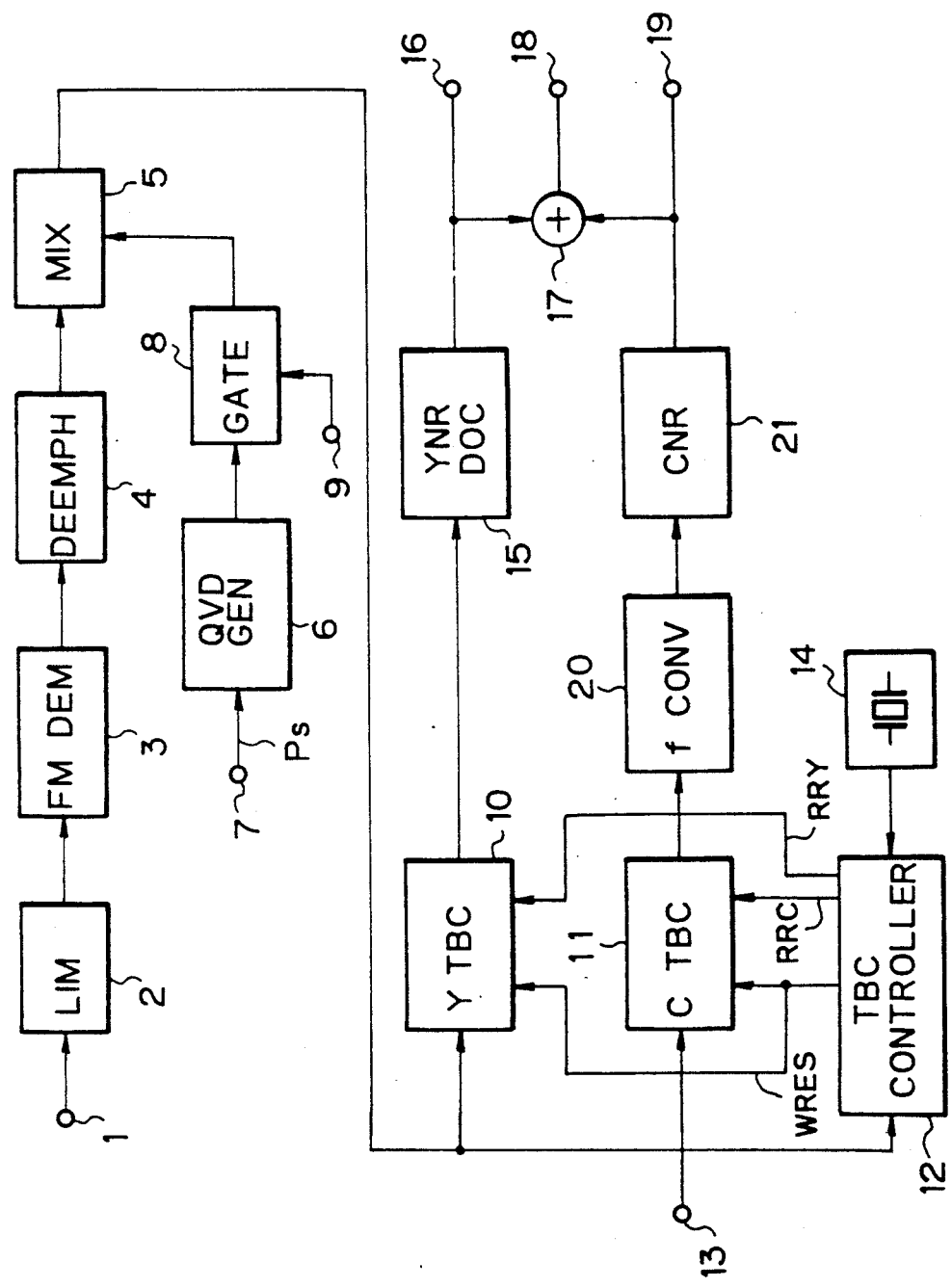
FIG. 1 is an overall block diagram of a video signal processing apparatus in accordance with an embodiment of the present invention.

Referring to the drawings in detail, and presently to FIG. 1 thereof, a video signal processing apparatus in accordance with a preferred embodiment of the present invention incorporated in a video tape recorder is operative to receive an FM modulated luminance signal of a reproduced video signal at an input terminal 1. The reproduced luminance signal is provided from a rotary magnetic recording/reproducing head of the video tape recorder (not shown for purposes of simplicity and clarity). Input terminal 1 is coupled with an input of a limiter 2 having an output coupled with an input of an FM demodulator 3. An output of the FM demodulator 3 is coupled with an input of a de-emphasis circuit 4. Limiter 2, FM demodulator 3 and deemphasis circuit 4 are operative in conventional fashion to demodulate the FM modulated luminance signal received at the input terminal 1 and to provide the same at an output of the de-emphasis circuit 4 coupled with a first input of a mixer 5 to provide the demodulated signal thereto.

A further input terminal 7 is provided to receive a switching pulse Ps which is generated from the output signal of a magnetic rotation detector associated with a tape guide drum of the rotary magnetic recording/reproducing head. The switching pulse Ps indicates the rotational phase of a magnetic head affixed to the tape guide drum so that the switching pulse Ps inverts with every field in synchronism therewith. The input terminal 7 is connected with the input of a quasi-vertical synchronization (QVD) signal generator 6 which is operative to produce the QVD signal appropriately delayed with respect to the leading and trailing edges of the switching pulse Ps to coincide with the vertical intervals of the demodulated luminance signal received at the first input terminal of the mixer 5. An output terminal of the QVD signal generator 6 is connected with an input of a gate circuit 8 which is selectively operative in response to a control signal received at a control terminal 9 thereof to supply the QVD signal to a second input of the mixer 5 to combine the same with the demodulated luminance signal during a variable or non-standard speed reproduction mode.

During a variable speed reproduction mode, the reproduced video signal is subject to large level changes, so that the vertical synchronization signal thereof may have insufficient amplitude for stably synchronizing the picture produced by a video monitor. Such variable speed reproduction modes include slow motion reproduction, still motion reproduction, que (quick forwarding) reproduction, review (rewinding) reproduction, etc. Accordingly, in such operational modes, an appropriate control signal is applied to the control terminal 9 of the gate circuit 8 to supply the QVD signal to be mixed with the reproduced luminance signal.

An output of the mixer 5 is connected with an input of a luminance signal time base compensator (Y TBC) 10 as well as to an input of a time base compensator (TBC) controller 12. A further input terminal 13 is provided to receive a low frequency converted color signal to be provided to an input of a color signal time base compensator (C TBC) 11. The TBC controller 12 is operative to produce a write clock synchronized with a horizontal synchronization signal separated from the demodulated luminance signal provided from the mixer 5 and having a frequency of 4 fsc, where fsc is equal to the NTSC color subcarrier frequency and is a multiple of the separated horizontal synchronization signal. The write clock signal is utilized in each of the TBC's 10 and 11 for sampling and digitizing the luminance signal and the low frequency converted color signal, and for writing the same in a respective memory in a corresponding one of the TBC's 10 and 11. The respective memories may be, for example, first-in-first-out (FIFO) memories each having a five line capacity.

The TBC controller 12 is operative to produce a read clock signal synchronized with a stable clock signal produced by a crystal oscillator 14. The TBC controller 12 also produces a write reset signal WRES supplied to each of the TBC's 10 and 11 for controlling the write operation thereof, and read reset signals RRY and RRC provided, respectively, to the Y TBC 10 and the C TBC 11, the read reset signals RRY and RRC for controlling the read operation of the corresponding memories. The read reset signals RRY and RRC are produced by the TBC controller 12 so that there is a predetermined time difference therebetween for the purpose of introducing a predetermined time difference between corresponding luminance and color signals read out from the respective memories of the TBC's 10 and 11. The signals read out from the TBC memories are converted to analog signals by respective digital-to-analog converters and provided thereby to corresponding output terminals of the TBC's 10 and 11.

A noise elimination and dropout compensation circuit (YNR DOC) 15 is coupled with the TBC 10 to receive the time base compensated luminance signal therefrom. The circuit 15 is operative to provide the luminance signal delayed by one horizontal line period by means of a 1 H delay circuit thereof and to substitute the delayed signal for a corresponding portion of the received luminance signal in response to the detection of a dropout therein. A dropout is represented by a dropout pulse having a pulse width corresponding to the dropout period or duration which is produced by monitoring the level of the reproduced luminance signal. The dropout pulse is supplied to the circuit 15 to appropriately substitute the delayed signal for the received signal in the event of a dropout. In accordance with one feature of the present invention, the dropout pulse undergoes the same time base compensation process as the luminance and color signals preferably by reducing the time base errors therein with the use of the C TBC 11, as explained in greater detail below. The time base compensated dropout pulse from the C TBC is supplied as a control signal to the noise elimination and dropout compensation circuit 15 for controlling dropout compensation therein.

In the slow reproduction mode, the reproduced luminance signal has a relatively poor signal to noise ratio (S/N). Accordingly, the circuit 15 is operative to carry out noise elimination in this mode of operation with the use of a cyclic comb filter. However, since the noise elimination process results in a deterioration of signal definition in the vertical direction, noise elimination is not carried out by the circuit 15 for the luminance signal in modes other than the slow reproduction mode.

After time base compensation in the TBC 11, the color signal is supplied thereby to the input of a frequency converter (f CONV) 20 which is operative to convert the low frequency converted color signal into a modulated color signal having a carrier frequency fsc equal to the standard NTSC color subcarrier frequency of approximately 3.58 MHz. The modulated color signal produced by the frequency converter 20 is supplied thereby to a color signal noise elimination (CNR) circuit 21 which carries out crosstalk elimination and contour compensation, as well as noise elimination utilizing a cyclic comb filter.

In order to determine whether the reproduced video signal exhibits vertical correlation, the circuit 15 includes a correlation detector which compares a currently received luminance signal with a previously received luminance signal by subtracting the two to produce a difference signal. A correlation detection signal, in turn, is produced based on the level of the difference signal. The detection signal is supplied to the noise elimination circuit 21 in order to disable its noise elimination circuit in the absence of vertical correlation, thus to avoid vertical deterioration of the modulated color signal due to the lack of vertical correlation thereof. It will be appreciated that, by generating the correlation detection signal with the use of the time base compensated luminance signal while simultaneously carrying out noise elimination for the modulated color signal after time base compensation thereof, it is possible to ensure that a time shift will not occur between the correlation detection signal and the modulated color signal which would prevent the correlation detection signal from accurately indicating the correlation of respective portions thereof.

After noise elimination and dropout compensation, the reproduced luminance signal is supplied by the circuit 15 to an output terminal 16 of the video signal processing apparatus, as well as to a first input of a mixer 17. The noise elimination circuit 21 supplies the modulated color signal to an output terminal 19 of the color signal reproducing apparatus, as well as with a second input of the mixer 17. The mixer 17 serves to combine the reproduced luminance signal and the modulated color signal and to supply the thus combined signals to an output terminal 18 of the video signal processing apparatus.

Figure 2:
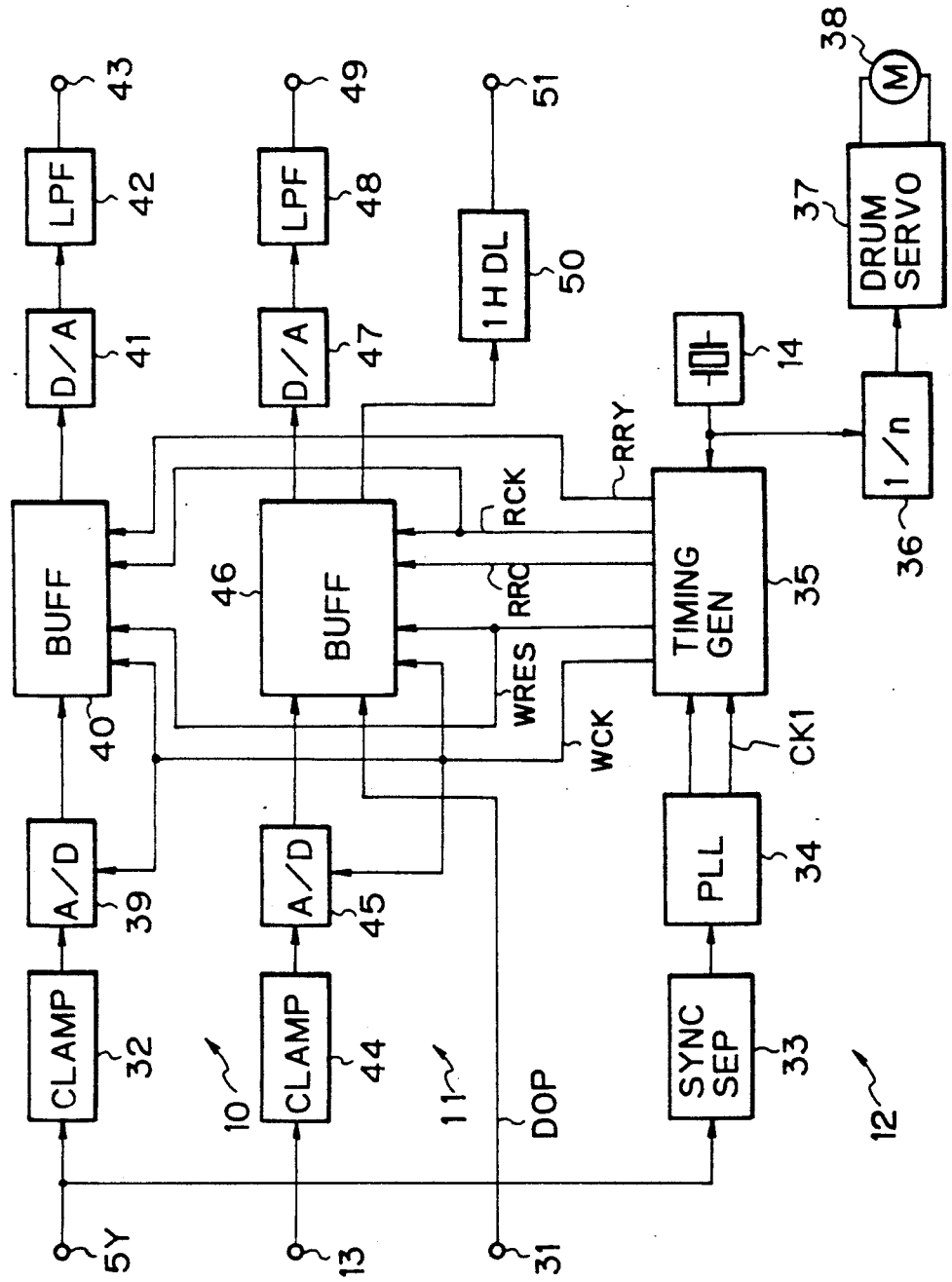
FIG. 2 is a block diagram of time base compensation circuitry included in the embodiment of FIG. 1.

With reference now to FIG. 2, the TBC's 10 and 11, together with the TBC controller 12 are illustrated therein in greater detail. The reproduced luminance signal is received at an input terminal 5Y coupled with respective inputs of a clamp circuit 32 of the time base compensator 10 and a synchronization separator 33 of the TBC controller 12. The low frequency converted color signal received at the input terminal 13 is supplied thereby to an input of a clamp circuit 44 of the time base compensator 11.

A further input terminal 31 is provided to receive the dropout pulse (DOP). The dropout pulse DOP may be generated, for example, through envelope detection of the signal provided at the output terminal of the limiter 2 (refer to FIG. 1) and, through level detection of this signal, producing a binary level pulse as the dropout pulse which assumes a high level when the envelope detected output of the limiter 2 is equal to or less than a predetermined level. The synchronization separating circuit 33 separates a horizontal synchronization signal from the luminance signal received at the input terminal 5Y and supplies the same to an input of a phase locked loop (PLL) 34 which produces a horizontal frequency signal synchronized with the reproduced luminance signal together with a clock signal in synchronism therewith having a frequency of 4 fsc. The horizontal frequency signal and the clock signal are supplied by the PLL 34 to respective input terminals of a timing generator 35. Timing generator 35 also receives the stable clock signal from the crystal oscillator 14.

The clock signal from the crystal oscillator 14 is also supplied to an input of a frequency divider (1/n) 36 which is operative to produce a control signal having a frequency which is (1/n) of the stable clock frequency, where n is a predetermined value selected to produce a frequency signal to that of the switching pulse Ps. The frequency divider 36 supplies the control signal to an input of a drum servo circuit 37 which in turn controls the rotational speed and phase of a drum motor 38. As explained in greater detail hereinbelow, the control signal from the frequency divider 36 is utilized by the drum servo circuit 37 to produce a servo reference signal for controlling the rotational phase of the motor 38 in order to avoid outrunning of write and read addresses of the time base compensators 10 and 11.

The clamp circuit 32 has an output coupled with an input of an analog-to-digital converter (A/D) 39 which is operative to sample and digitize the luminance signal in synchronism with a write clock (WCK) supplied by the timing generator 35. The write clock is synchronized with the 4 fsc clock CK1 provided by the phase locked loop 34, so that the analog-to-digital converter 39 outputs a digitized luminance signal with a sampling frequency of 4 fsc synchronized with the reproduced luminance signal. Analog-to-digital converter 39 produces digitized samples with a word length of 8 bits which it then supplies to a buffer memory 40 which in turn stores the digitized samples in synchronism with the write clock and under the control of the write reset signal WRES also supplied by the timing generator 35. As in the case of the write clock WCK, the write reset signal WRES is synchronized with the signals output by the phase locked loop 34.

The timing generator 35 also produces a read clock RCK and a luminance read reset signal RRY synchronized with the stable clock produced by the crystal oscillator 14. The timing generator 35 supplies the read clock RCK and the luminance read reset signal RRY to the buffer memory 40 in order to read the previously stored digitized luminance signal therefrom at a stable rate, such that time base fluctuation thereof is thereby eliminated. A data output of the buffer memory 40 is coupled with an input of a digital-to-analog converter (D/A) 41 to provide the digitized luminance signal read from memory thereto for conversion to an analog luminance signal. An output of the digital-to-analog converter 41 is coupled with a input of a low pass filter 42 to supply the analog luminance signal thereto to suppress high frequency components therein. An output terminal 43 of the luminance TBC 10 is coupled with an output of the low pass filter 42 to receive the time base compensated analog luminance signal therefrom.

The time base compensator 11, similarly to the time base compensator 10, includes a clamping circuit 44 having an input coupled with the input terminal 13 to receive the low frequency converted color signal therefrom and an output terminal coupled with an input of an analog-to-digital converter (A/D) 45 which serves to digitize the color signal in synchronism with the write clock WCK from the timing generator 35. The converter 45 supplies the digitized color signal to a first data input of a buffer memory 46 to store the same in synchronism with the write clock and under the control of the write reset signal WRES supplied by the timing generator 35. The digitized color signal is read out from the buffer memory 46 in synchronism with the read clock RCK supplied by the timing generator 35. However, for the purpose of introducing a predetermined time difference between the luminance and color signals read from the respective memories 40 and 46, buffer memory 46 is supplied with a color read reset signal RRC from the timing generator 35, as explained in greater detail hereinbelow. The digitized color signal read from the buffer memory 46 in synchronism with the read clock RCK and from which time base fluctuation has been eliminated is supplied by the buffer memory 46 to an input of a digital-to-analog converter (D/A) 47 which reconverts the digitized color signal to an analog color signal. The digital-to-analog converter 47 supplies the analog color signal at an output thereof coupled with an input of a low pass filter 48 which in turn is operative to suppress high frequency components therein. An output terminal 49 of the time base compensator 11 is coupled with an output of the low pass filter 48 to receive the analog color signal therefrom.

Each of the buffer memories 40 and 46 has the capacity to store five horizontal lines of eight-bit words. Unlike the digitized luminance signal, the digitized color signal is supplied by the analog-to-digital converter 45 in the form of six-bit words, so that additional memory space is made available in the buffer memory 46. The input terminal 31 is coupled with a second data input of the buffer memory 46 to supply the dropout pulse (DOP) thereto and the buffer memory 46 is operative to store the one bit dropout pulse in the additional memory space which is not required for storing the digitized color signal. Like the digitized color signal, the dropout pulse is written in the buffer memory 46 in synchronism with the write clock WC and read therefrom in synchronism with the stable read clock RCK, so that time base fluctuation in the dropout pulse is eliminated in the same manner as in the case of the digitized color signal, as well as the digitized luminance signal supplied from the buffer memory 40.

The stored dropout pulse is read from the buffer memory 46 to a second data output terminal coupled with an input of a one horizontal period delay circuit (1 HDL) 50 from which the time base compensated dropout pulse, delayed by one horizontal period, is supplied to an output terminal 51 of the time base compensator 11. The delay circuit 50 serves to compensate for a one horizontal line interval time differential between the luminance and color signals as read from their respective buffer memories 40 and 46, as explained in greater detail hereinbelow. It will be appreciated that since time base compensation of the dropout pulse is carried out in the buffer memory 46, there is no need to provide additional memory capacity to carry out this function. The output terminal 51 is coupled with the noise elimination and dropout compensation circuit 15 (see FIG. 1) to substitute the delayed luminance signal for the currently received luminance signal when the dropout pulse assumes a high level, thus indicating a dropout condition in the currently received luminance signal. Since the luminance signal and the dropout pulse are subjected to the same time base compensation, the dropout pulse thereby coincides with the corresponding portion of the luminance signal subject to the dropout indicated thereby.

Figure 3:
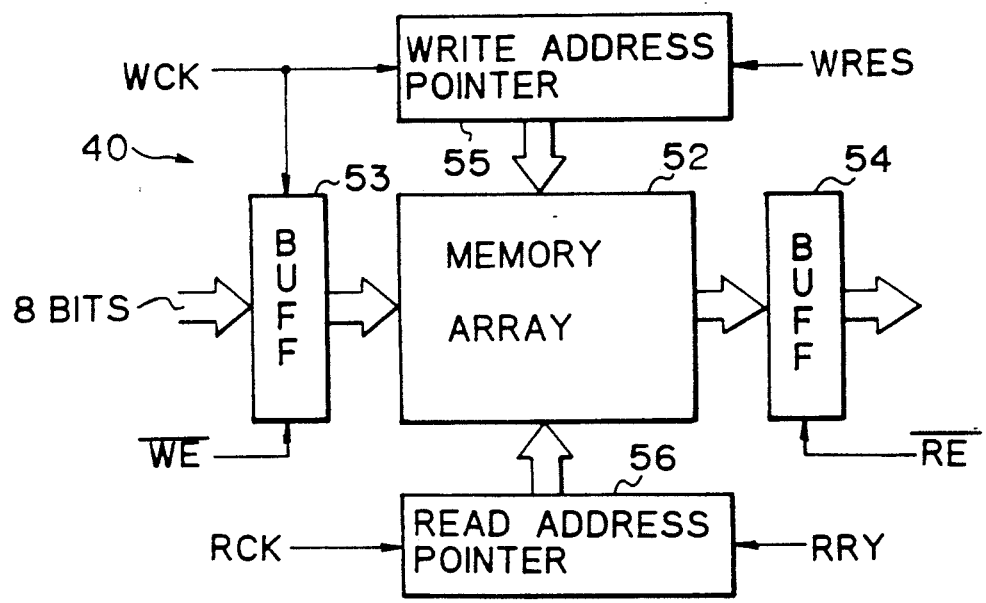
FIG. 3 is a block diagram of an exemplary buffer memory of the type used in the time base compensation circuitry of FIG. 2.

With reference now to FIG. 3, the buffer memory 40 is illustrated in greater detail therein and includes a memory array 52 having a capacity of 5,048 eight-bit words arranged as a first-in-first-out (FIFO) memory. Accordingly, the memory array 52 has sufficient capacity to store five horizontal lines of NTSC luminance data including 4,550 words that is five lines thereof sampled at a rate of 4 fsc, yielding 910 samples per line.

The data input of the buffer memory 40 is coupled with an eight-bit data input of an input buffer 53 having a data output coupled with a data input of the memory array 52 and operative under the control of a write enable signal $\overline{WE}$ to receive digitized luminance signal data from the converter 39 in synchronism with the write clock WCK. A data output of the memory array 52 is coupled with a data input of an output buffer 54 having a data output coupled with a data input of the digital-to-analog converter 41 (refer to FIG. 2) to supply the digital luminance data read from the memory array 52 to the converter 41 under the control of a read enable signal $\overline{RE}$.

The buffer memory 40 also includes a write address pointer generator 55 operative to produce a write address which it supplies to an address input of the memory array 52 and a read address pointer generator 56 operative to produce a read address which it supplies to the memory array 52 to determine a read position therein. The write address pointer generator 55 receives the write reset signal WRES from the timing generator 35 whereupon the generator 55 is reset to an initial or zero address. The generator 55 also receives the write clock WCK from the timing generator 35 thus to increment the address generated thereby. The read address pointer generator 56 receives the luminance read reset signal RRY from the timing generator 35, thus to reset the address produced thereby to zero, and the read clock RCK from the timing generator 35 to increment the address produced by the generator 56. The buffer memory 46 is constructed in the same manner as the buffer memory 40 as shown in FIG. 3, except that in place of the luminance read reset signal RRY, the buffer memory 46 is supplied with the color read reset signal RRC.

Figure 4:
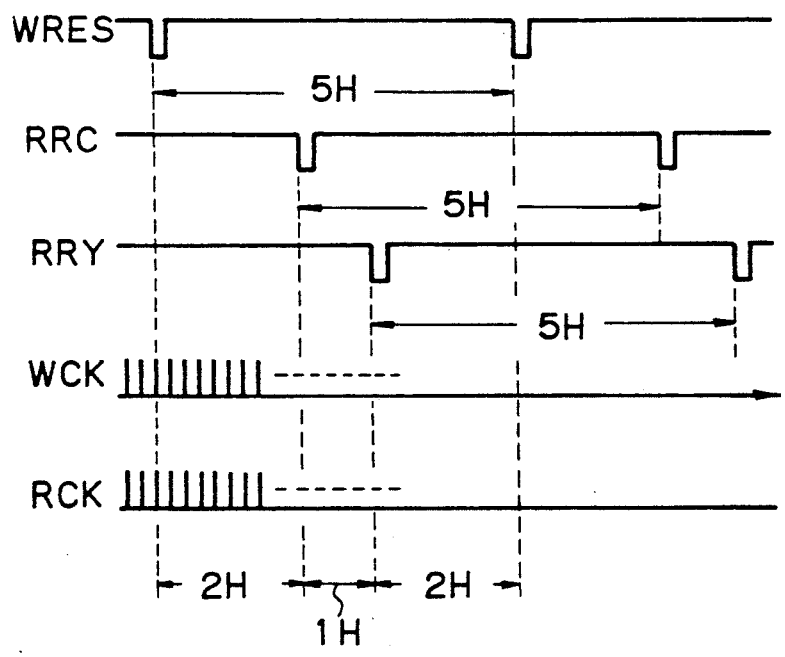
FIG. 4 is a timing chart for use in illustrating the operation of the buffer memory of FIG. 3.

FIG. 4 provides a timing diagram of the various clocks and reset signals supplied by the timing generator 35 to the buffer memories 40 and 46. It will be seen from FIG. 4 that the write reset signal the color read reset signal RRC and the luminance read reset signal RRY each has a period of five horizontal line intervals (5H). The luminance read reset signal RRY is delayed with respect to the color read reset signal RRC by one horizontal line interval, while the time difference between the write reset signal WRES, on the one hand, and the read reset signals RRC and RRY varies according to the time base fluctuation inherent in the reproduced video signal. In the absence of time base fluctuation, however, the low frequency converted color signal is read from the buffer memory 46 after a delay of two horizontal line intervals therein, while the luminance signal is read from the buffer memory 40 after a corresponding delay of three horizontal line intervals, so that corresponding portions of the luminance and color signals are read from the memories 40 and 46 at different respective times with a predetermined time difference of one horizontal line therebetween.

As noted hereinabove, the noise elimination circuit 21 includes a crosstalk elimination circuit. Such crosstalk elimination circuits take the form of a comb filter employing a one horizontal line period delay line or a three-line logical comb filter which compares a plurality of samples in the received waveform in order to adapt thereto for eliminating crosstalk while avoiding blurring of the signal in the vertical direction. Such filters introduce a one horizontal line delay in the color signal relative to the luminance signal which must be compensated. The present embodiment efficiently and economically provides such compensation by introducing a one horizontal line period delay of the luminance signal relative to the color signal as the two are read from their respective time base compensation memories. Additional time differentials between the luminance and color signals introduced by filters employed in post processing of the time base compensated signals are likewise efficiently and economically compensated by appropriately adjusting the timing of at least one of the read reset signals RRY and RRC.

Figure 5:
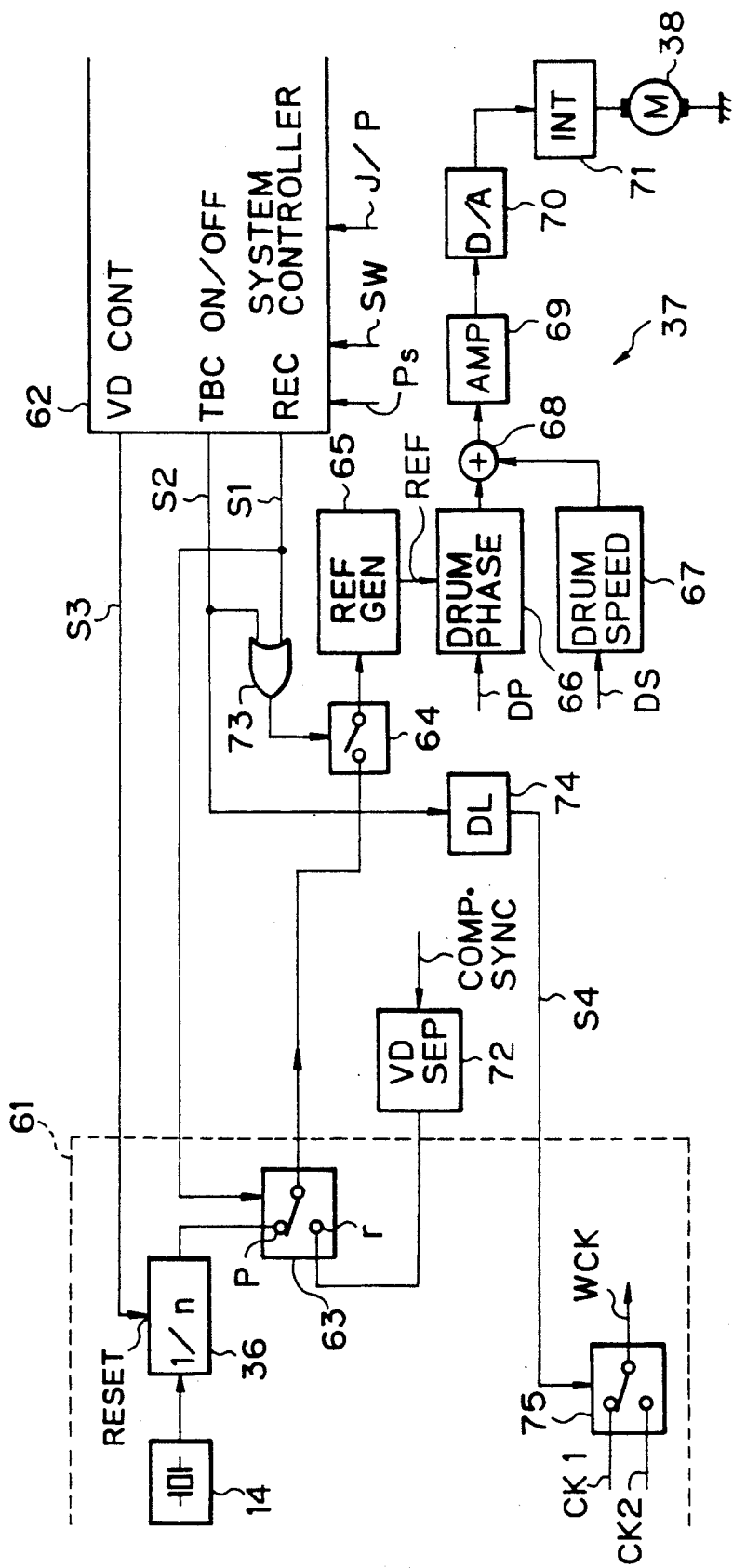
FIG. 5 is a block diagram of control circuitry operatively connected with a drum motor servo system of a video tape recorder.

With reference now to FIG. 5, the drum servo circuit 37 of FIG. 2 is illustrated therein in greater detail for demonstrating the manner in which it is controlled in dependence on the operational state of the video tape recorder. As shown in FIG. 5, the crystal oscillator 14 and frequency divider 36, as well as certain portions of the time base compensation circuitry, are commonly constructed in the form of an integrated circuit 61. Also shown in FIG. 5 is a system controller 62 exercising overall control of the video tape recorder including control of the record and reproduction modes thereof as well as of the ON/OFF state of the time base compensation circuitry and associated control of the drum servo circuitry 37, as explained in greater detail hereinbelow.

The system controller 62 is operative to control the ON/OFF state of the time base compensation circuitry based on the state of a user operable switch together with the operational state of the video tape recorder. Accordingly, the system controller 62 receives a detection signal SW indicating the state of a user operable switch as well as a detection signal J/P which indicates whether the video tape recorder is operating in a normal reproduction mode or in a variable speed reproduction mode in accordance with the user's operation of a jog dial (for example, in the course of an editing operation). The system controller 62 responds to the detection signals SW and J/P to produce a control signal S2 which indicates the ON state of the time base compensation circuitry when both of the detection signals SW and J/P are high, and a low state when either of the detection signals SW and J/P is low. The system controller 62 also produces a control signal S1 which assumes a high state to indicate that the video tape recorder is operating in the record mode, and a low state to indicate that the video tape recorder is then operating in a reproduce mode. In addition, the system controller 62 produces a control signal S3 which serves to reset the frequency divider 36 in order to adjust the phase of the control signal output thereby to correspond with that of the control signal S3.

As noted hereinabove, the control signal output by the frequency divider 36 is provided for generating a servo reference signal for controlling the phase of rotation of the motor 38 so that the average of the write and read clock signals used to generate the write and read addresses of the time base compensators 10 and 11, remain essentially equal in order to avoid outrunning of the write and read addresses. In order to appropriately supply the control signal from the frequency divider 36 to the drum servo circuitry 37, a switching circuit 63 is provided having a first fixed terminal P connected with the output of the frequency divider 36 and a control input coupled with the system controller 62 to receive the control signal S1 therefrom. When the state of the control signal S1 is low indicating the reproduce mode, the switching circuit 63 is operative to couple its input terminal P to an output terminal thereof thus to provide the control signal from the frequency divider 36 to an input of a further switching circuit 64. Switching circuit 64 has an output terminal coupled with an input of a reference signal generator 65 including a phase locked loop (PLL) which is operative to produce a servo reference signal REF synchronized with a signal received from the output terminal of the switching circuit 64. As explained in greater detail hereinbelow, the switching circuit 64 is operative to connect the control signal supplied from the switching circuit 63 to the input of the reference signal generator 65 at such times that the control signal S2 is high thus indicating the ON state of the time base compensators 10 and 11.

A drum phase servo circuit 66 produces a phase error signal representing a phase difference between a detection signal DP indicating the drum's rotational phase and the servo reference signal REF. A drum velocity servo circuit 67 produces a velocity error signal based on a speed detection signal DS having a frequency proportional to the drum's rotational speed. An adding circuit 68 has a first input coupled with the drum phase servo circuit 66 to receive the phase error signal and a second input coupled with the drum velocity servo circuit 67 to receive the velocity error signal, and produces a combined error signal proportional to the sum of the phase and velocity signals. The combined error signal is supplied by the adding circuit 68 to an input of an amplifier which appropriately scales the combined error signal before it is supplied thereby to an input of a digital-to-analog converter (D/A) 70 which serves to produce an analog version thereof. An output of the digital-to-analog converter 70 is coupled with an input of an integrating circuit 71 to supply the analog version of the combined error signal thereto. The integrated circuit 71 serves to produce an analog drive signal based on the combined error signal received thereby for driving the drum motor 38 so that the phase thereof is controlled in response to the servo reference signal REF.

In the record mode of the video tape recorder, a synchronization separating circuit 72 receives the composite synchronization signals from a video signal being recorded and separates the vertical sync signal therefrom. An output of the synchronization separating circuit 72 is coupled with a second fixed terminal r of the switching circuit 63 to provide the separated vertical sync signal thereto. As noted hereinabove, the state of the switching circuit 63 is controlled by the control signal S1 provided by the system controller 62. In the record mode, the control signal S1 assumes a high state thus to couple the second fixed terminal r of the switching circuit 63 to the output thereof in order to provide the vertical sync signal to the input of the switching circuit 64 An OR gate 73 has first and second inputs each coupled with the system controller 62 to receive the control signals S1 and S2, respectively, therefrom. Accordingly, in the record mode when the state of the control signal S1 is high, the OR gate 73 outputs a high level signal to the switching circuit 64 so that it is turned on thereby to couple the vertical sync signal received at its input to the input of the reference signal generator 65. Therefore, the servo reference signal REF produced by the reference signal generator 65 is synchronized with the vertical synchronization signal from the video signal being recorded in the record mode of the video tape recorder, so that the drum phase is aligned with that of the signal being recorded thereby.

In the reproduction mode, the control signal S1 assumes a low state, thus to control the switching circuit 63 to couple its first fixed input P to the output thereof to supply the control signal produced by the frequency divider 36 to the input of the switching circuit 64. Although the control signal S1 is low at this time, so long as the control signal S2 is high indicating that the time base compensators are ON, the OR gate 73 outputs a high level thus to close the switching circuit 64, so that the control signal from the frequency divider 36 is provided as the input to the reference signal generator 65. Consequently, in the reproduction mode, so long as the time base compensators are ON, the servo reference signal REF is synchronized with the control signal produced by the frequency divider 36. Since the control signal output by the frequency divider 36 is synchronized with the read clock, the phase of the drum motor 38 is thus adjusted appropriately to maintain the average values of the write and read clocks produced by the TBC controller essentially equal, thus to prevent outrunning of the write and read addresses.

The write clock WCK is supplied from the output terminal of a further switching circuit 75 also included in integrated circuit 61, which serves to couple one of two fixed input terminals thereof to its output terminal depending on the state of a control signal S4 supplied to a control input thereof. The control signal S4 is a delayed version of the control signal S2 supplied from the output of a delay circuit 74. A first fixed input terminal of the switching circuit 75 is coupled with the phase locked loop (PLL) 34 (refer to FIG. 2) to receive the clock signal CK1 therefrom. When the system controller 62 switches the state of the signal S2 from a low to a high level in order to turn on the time base compensators, the control signal S4 likewise assumes a high level after the delay introduced by the delay circuit 74. Thereupon the switching circuit 75 is controlled by the high level of the control signal S4 to couple its first fixed input terminal to its output in order to supply the clock signal CK1 from the PLL 34 for sampling the reproduced luminance and color signals and writing the same in their respective memories.

A second fixed input terminal of the switching circuit 75 is supplied with a clock CK2 having a fixed frequency similar to the read clock. When the time base compensators are turned off and the control signal S4 assumes a low level, the switching circuit 75 changes state to couple its second fixed input terminal to its output terminal in order to supply the clock signal CK2 as the write clock WCK. In this state, the time base compensation circuits are operative to appropriately delay the luminance and color signals by periods equal to three and two horizontal line intervals, respectively, in order to compensate for the subsequent one horizontal line interval delay of the color signal subsequently introduced in the course of crosstalk elimination by the noise elimination circuit 21.

Referring to FIGS. 6A through 6E, the waveform diagrams provided thereby illustrate the various control signals produced when a user turns on the time base compensators of the video tape recorder by actuating the user operable switch. As illustrated in FIG. 6A, the state of the switch detection signal SW changes from a low to a high level when the user thus turns the time base compensators ON. FIG. 6B provides a waveform diagram illustrating the switching pulse Ps generated from the detection signal DP to indicate the drum's rotational phase. With reference also to FIG. 5, it will be seen that the switching pulse Ps is supplied as an input signal to the system controller 62, for use in generating the control signals S2-S4. With reference to FIG. 6C, the control signal S3 assumes a high level in response to a low to high transition of the switching pulse Ps after the detection signal SW is brought to a high level by actuation of the switch by the user. The control signal S3 switches state from the high to the low level after a predetermined time period t1 commencing with the trailing edge of the corresponding pulse Ps, whereupon the frequency divider 36 is reset in response thereto.

The drum servo circuits are so constructed that, when the time base compensators are OFF, the phase of the servo reference signal REF possesses a predetermined relationship with the phase of the switching pulse Ps. In order to preserve this phase relationship so that the servo system is not forced to readjust its phasing, thus resulting in considerable delay before stable operation is again achieved, therefore, the delay period t1 is selected so that the control signal output by the frequency divider 36 maintains the predetermined phase relationship of the servo reference signal REF with respect to the switching pulse Ps.

In response to the high to low transition of the control signal S3, the control signal S2 thereupon switches from a low to a high state thus to actuate the switching circuit 64 to supply the control signal output by the frequency divider 36 to the input of the reference signal generator 65. After the low to high transition of the control signal S2, the delay circuit 74 delays the corresponding low to high transition of the control signal S4 for a predetermined time interval t2 after which the switching circuit 75 is actuated to couple the clock signal CK1 from the PLL 34 as the write clock signal WCK which initiates the operation of the time base compensators. The predetermined time interval t2 is selected as an amount of time necessary to prevent operation of the time base compensators until stable operation of the drum servo system can be assured. It will be appreciated that in the present embodiment the time interval t2 may be selected as an advantageously short interval since the timing of the control signal output by the frequency divider 36 has been previously adjusted by means of the control signal S3 in order to minimize the disturbance to the servo system thereby and any consequent instability thereof.

When the user actuates the switch to turn the time base compensators OFF, the system controller responds by bringing the control signal S2 to a low level, and simultaneously, the control signal S4 is likewise brought to a low level by appropriate means (not shown for purposes of simplicity and clarity).

In the example of FIGS. 6A-6E, it is assumed that the ON/OFF state of the time base compensators is controlled solely by the actuation of a switch by the user. However, when the jog mode is selected by the user, even though the time base compensators have been switched on as indicated by a high state of the detection signal SW, the time base compensators will be turned off automatically in response to the detection signal J/P similarly to the manner in which the system responds to a high to low transition of the detection signal SW. The jog mode includes variable speed reproduction modes such as slow reproduction, still reproduction, cue reproduction and review reproduction. Since the frequency of the horizontal synchronization signal of the reproduced video signal can vary over a substantial range during variable speed reproduction, it is consequently very difficult to carry out time base compensation at that time. Accordingly, the time base compensators are automatically turned off under the control of the detection signal J/P when variable speed reproduction is selected. When the mode of operation is switched back to normal reproduction from the jog mode, the time base compensators are turned on the in the same fashion as described above, but in response to a change of state of the detection signal J/P which is appropriately timed to ensure stable operation.

It will be appreciated that the video signal processing apparatus and method embodying the present invention affords the ability efficiently and economically to compensate for differential time delays experienced by the reproduced luminance and color signals by introducing predetermined delays therein simultaneously with time base compensation thereof without the provision of separate means for achieving each function. The predetermined delays thus introduced can serve not only to compensate for the delay introduced in crosstalk elimination but also to compensate for delays produced by other filtering devices.

It will be appreciated further that an undesirable time shift between a dropout detection signal and a time base compensated video signal is efficiently and economically achieved by compensating time base errors in the dropout detection signal in common with one of the luminance and color signals, once again avoiding the need to provide separate means to carry out each function.

In addition, it will be seen that, since the phase of a reference signal synchronized with the read clock of the time base compensators is adjusted to establish a predetermined relationship thereof with the phase of the drum phase signal prior to switching the time base compensators from an inactive state to an active state, the servo system is advantageously brought to a phase locked state swiftly once a command to turn on the time base compensators in generated.

It will also be seen that through the provision of a means for disabling the operation of the time base compensators when the operational mode is switched to a non-standard reproduction speed, as in a variable speed reproduction mode, disturbance of the reproduced picture as a consequence of time base fluctuation exceeding the operational range of the time base compensators is avoided.

Although a specific embodiment of the invention has been described in detail herein with reference to the accompanying drawings, it is to be understood that the invention is not limited to this precise embodiment, and that various changes and modifications may be effected therein by one skilled in the art without departing from the scope or spirit of the invention as defined in the appended claims.

What is claimed is:

1. A video signal processing apparatus for processing a luminance signal and a color signal of a video signal reproduced from a recording medium, comprising:
   video signal processing means for processing one of said luminance signal and said color signal of the reproduced video signal such that a predetermined delay is introduced in said one of said luminance signal and said color signal;
   first time base compensator means for reducing time base errors in said luminance signal to produce a time base compensated luminance signal; said first time base compensator means including first memory means for storing said luminance signal;
   second time base compensator means for reducing time base errors in said color signal to produce a time base compensated color signal; said second time base compensator means including second memory means for storing said color signal;
   first clock means for producing a write clock signal synchronized with said video signal;
   means for producing a stable clock signal;
   second clock means for producing a read clock signal synchronized with the stable clock signal; and
   controller means for writing said luminance signal and said color signal into said first memory means and said second memory means, respectively, in response to said write clock signal, and for reading said luminance signal and said color signal from said first memory means and said second memory means, respectively, in response to said read clock signal;
   said controller means being operative to control the reading of said luminance signal and said color signal from said first memory means and said second memory means such that corresponding portions of said luminance signal and said color signal are delayed by respectively different amounts so that said predetermined delay introduced by said video signal processing means is compensated.

2. The video signal processing apparatus according to claim 1, further comprising means for demodulating a frequency modulated luminance signal of the reproduced video signal to produce a demodulated luminance signal, and wherein:
   said first time base compensator is operative to reduce time base errors in said demodulated luminance signal; and
   said second time base compensator is operative to reduce time base errors in a color signal having a low frequency carrier.

3. A video signal processing apparatus for processing a luminance signal and a color signal of a video signal reproduced from a recording medium, comprising:
   first time base compensator means for reducing time base errors in said luminance signal to produce a time base compensated luminance signal; said first time base compensator means including first memory means for storing said luminance signal;
   second time base compensator means for reducing time base errors in said color signal to produce a time base compensated color signal; said second time base compensator means including second memory means for storing said color signal;
   first clock means for producing a write clock signal synchronized with said video signal;
   means for producing a stable clock signal;
   second clock means for producing a read clock signal synchronized with the stable clock signal;
   controller means for writing said luminance signal and said color signal into said first memory means and said second memory means, respectively, in response to said write clock signal and for reading said luminance signal and said color signal from said first memory means and said second memory means, respectively, in response to said read clock signal;

said controller means being operative to control the reading of said luminance signal and said color signal from said first memory means and said second memory means such that corresponding portions of said luminance signal and said color signal are read therefrom at different respective times with a predetermined time difference therebetween;

means for producing a dropout signal indicating a dropout of the reproduced video signal;

one of said first and second time base compensator means being operative to reduce time base errors in said dropout signal in common with a respective one of the luminance and color signals to produce a time base compensated dropout signal; and dropout compensation means coupled with one of the first and second time base compensator means for compensating for dropouts in a respective one of the time base compensated luminance and color signals in response to said time base compensated dropout signal.

4. The video signal processing apparatus according to claim 3, wherein said second time base compensator means is operative to reduce time base errors in said dropout signal in common with said color signal to produce said time base compensated dropout signal.

5. The video signal processing apparatus according to claim 4, wherein said first time base compensator means includes first digitizing means for converting said luminance signal to a plurality of first digital words each having a first predetermined number of digits and for storing said plurality of first digital words in said first memory means; and said second time base compensator means includes second digitizing means for converting said color signal to a plurality of second digital words each having a second predetermined number of digits less than said first predetermined number of digits and for storing said plurality of second digital words in a first portion of said second memory means; said second memory means being operative to store said dropout signal in a second portion thereof.

6. A video signal processing apparatus for processing a luminance signal and a color signal of a video signal reproduced from a recording medium, comprising:

reproducing means for reproducing said video signal from a recording medium;

first time base compensator means for reducing time base errors in said luminance signal to produce a time base compensated luminance signal; said first time base compensator means including first memory means for storing said luminance signal;

second time base compensator means for reducing time base errors in said color signal to produce a time base compensated color signal; said second time base compensator means including second memory means for storing said color signal;

first clock means for producing a write clock signal synchronized with said video signal;

means for producing a stable clock signal;

second clock means for producing a read clock signal synchronized with the stable clock signal;

controller means for writing said luminance signal and said color signal into said first memory means and said second memory means, respectively, in response to said write clock signal and for reading said luminance signal and said color signal from said first memory means and said second memory means, respectively, in response to said read clock signal;

said controller means being operative to control the reading of said luminance signal and said color signal from said first memory means and said second memory means such that corresponding portions of said luminance signal and said color signal are read therefrom at different respective times with a predetermined time difference therebetween;

said reproducing means including a rotary drum operative to produce a drum phase signal indicating a rotational phase of said rotary drum and servo control means for controlling the rotational phase of said rotary drum such that its drum phase signal coincides with a servo reference signal;

switching means for selectively switching the first and second time base compensators from an inactive state to an active state thereof;

means for producing a stable reference signal synchronized with said stable clock signal;

means for producing said servo reference signal such that said servo reference signal is synchronized with said stable reference signal during the active state of said first and second time base compensators; and means for adjusting the phase of said stable reference signal to establish a predetermined relationship thereof with the phase of said drum phase signal prior to switching the first and second time base compensators from an inactive state to an active state.

7. A video signal processing apparatus for processing a luminance signal and a color signal of a video signal reproduced from a recording medium, comprising:

reproducing means for reproducing said video signal from a recording medium;

first time base compensator means for reducing time base errors in said luminance signal to produce a time base compensated luminance signal; said first time base compensator means including first memory means for storing said luminance signal;

second time base compensator means for reducing time base errors in said color signal to produce a time base compensated color signal; said second time base compensator means including second memory means for storing said color signal;

first clock means for producing a write clock signal synchronized with said video signal;

means for producing a stable clock signal;

second clock means for producing a read clock signal synchronized with the stable clock signal;

controller means for writing said luminance signal and said color signal into said first memory means and said second memory means, respectively, in response to said write clock signal and for reading said luminance signal and said color signal from said first memory means and said second memory means, respectively, in response to said read clock signal;

said controller means being operative to control the reading of said luminance signal and said color signal from said first memory means and said second memory means such that corresponding portions of said luminance signal and said color signal are read therefrom at different respective times with a predetermined time difference therebetween;

said reproducing means including a rotary drum operative to produce a drum phase signal indicating a rotational phase of said rotary drum and servo control means for controlling the rotational phase of said rotary drum such that its drum phase signal coincides with a servo reference signal;

said apparatus further comprising switching means for selectively switching the first and second time base compensators from an inactive state to an active stated based on one of the state of a user actuable switch and an operational state of said reproducing means;

means for producing a stable reference signal synchronized with said stable clock signal;

means for producing said servo reference signal such that said servo reference signal is synchronized with said stable reference signal during the active state of said first and second time base compensators; and means for adjusting the phase of said stable reference signal to establish a predetermined relationship thereof with the phase of said drum phase signal prior to switching the first and second time base compensators from an inactive state to an active state.

8. A video signal processing apparatus for processing a luminance signal and a color signal of a video signal reproduced from a magnetic tape, comprising:

reproducing means having a magnetic head for reproducing said video signal from said magnetic tape;

first time base compensator means for reducing time base errors in said luminance signal to produce a time base compensated luminance signal; said first time base compensator means including first memory means for storing said luminance signal;

second time base compensator means for reducing time base errors in said color signal to produce a time base compensated color signal; said second time base compensator means including second memory means for storing said color signal;

first clock means for producing a write clock signal synchronized with said video signal;

means for producing a stable clock signal;

second clock means for producing a read clock signal synchronized with the stable clock signal;

controller means for writing said luminance signal and said color signal into said first memory means and said second memory means, respectively, in response to said write clock signal, and for reading said luminance signal and said color signal from said first memory means and said second memory means, respectively, in response to said read clock signal;

said controller means being operative to control the reading of said luminance signal and said color signal from said first memory means and said second memory means such that corresponding portions of said luminance signal and said color signal are read therefrom at different respective times with a predetermined time difference therebetween;

said reproducing means being operative to transport said magnetic tape past said magnetic head (i) in a first operational mode at a speed corresponding with a recording speed of said video signal, and (ii) in a second operational mode at a speed differing from said recording speed;

said apparatus further comprising means for disabling the operation of the first and second time base compensator means when said reproducing means is in said second operational mode.

9. A video signal processing apparatus for processing a luminance signal and a color signal of a video signal reproduced from a recording medium, comprising:

first time base compensator means for reducing time base errors in said luminance signal to produce a time base compensated luminance signal; said first time base compensator means including first memory means for storing said luminance signal;

second time base compensator means for reducing time base errors in said color signal to produce a time base compensated color signal; said second time base compensator means including second memory means for storing said color signal;

first clock means for producing a write clock signal synchronized with said video signal;

means for producing a stable clock signal;

second clock means for producing a read clock signal synchronized with the stable clock signal;

controller means for writing said luminance signal and said color signal into said first memory means and said second memory means, respectively, in response to said write clock signal and for reading said luminance signal and said color signal from said first memory means and said second memory means, respectively, in response to said read clock signal;

the first and second memory means including respective first and second read address generating means for generating corresponding first and second read addresses;

said controller means being operative to provide respective first and second read address control signals to said first and second read address generating means to control the generation of said first and second read addresses such that corresponding portions of said luminance signal and said color signal are read from said first and second memory means at different respective read times with a predetermined time difference therebetween.

10. The video signal processing apparatus according to claim 9, wherein said first and second read address generating means are operative to increment said corresponding first and second read addresses in response to said read clock signal and wherein said controller means is operative to reset said first and second read addresses by providing said first and second read address control signals to said first and second read address generating means, respectively, said controller means being operative to provide said first and second read address control signals at different respective reset times such that said first and second read addresses are reset at said different respective read times.

11. A method of processing a video signal reproduced from a recording medium, the video signal including a luminance signal and a color signal, comprising the steps of:

processing one of said luminance signal and said color signal of the reproduced video signal such that a predetermined delay is introduced in said one of said luminance and said color signal;

reducing time base errors in said luminance signal by storing said luminance signal in a first memory means in response to a write clock signal synchronized with said video signal, producing a stable clock signal and reading said luminance signal from said first memory means in response to a read clock signal synchronized with the stable clock signal; and reducing time base errors in said color signal by writing said color signal in a second memory means in response to said write clock signal and reading said color signal from said second memory means in response to said read clock signal such that corresponding portions of said luminance signal and said color signal are delayed by respectively different amounts so that said predetermined delay introduced in said one of said luminance signal and said color signal is compensated.

12. A method of processing a video signal reproduced from a recording medium, the video signal including a luminance signal and a color signal, comprising the steps of:

reducing time base errors in said luminance signal by storing said luminance signal in a first memory means in response to a write clock signal synchronized with said video signal, producing a stable clock signal and reading said luminance signal from said first memory means in response to a read clock signal synchronized with the stable clock signal;

reducing time base errors in said color signal by writing said color signal in a second memory means in response to said write clock signal and reading said color signal from said second memory means in response to said read clock signal such that corresponding portions of said luminance signal and said color signal are read from the first and second memory means at different respective times with a predetermined time difference therebetween;

producing a dropout signal indicating a dropout of the reproduced video signal;

reducing time base errors in said dropout signal in common with the reduction of time base errors in a respective one of the luminance and color signals to produce a time base compensated dropout signal; and compensating for dropouts in at least one of the time base compensated luminance and color signals in response to said time base compensated dropout signal.

13. A method of processing a video signal reproduced from a recording medium, the video signal including a luminance signal and a color signal, comprising the steps of:

reproducing said video signal from a recording medium with the use of a rotary drum operative to produce a drum phase signal indicating a rotational phase of the rotary drum;

reducing time base errors in said luminance signal by storing said luminance signal in a first memory means in response to a write clock signal synchronized with said video signal, producing a stable clock signal and reading said luminance signal from said first memory means in response to a read clock signal synchronized with the stable clock signal;

reducing time base errors in said color signal by writing said color signal in a second memory means in response to said write clock signal and reading said color signal from said second memory means in response to said read clock signal such that corresponding portions of said luminance signal and said color signal are read from the first and second memory means at different respective times with a predetermined time difference therebetween;

producing a stable reference signal synchronized with said stable clock signal;

prior to storing said luminance signal and said color signal in said first and second memory means, adjusting the phase of said stable reference signal to establish a predetermined relationship thereof with the phase of said drum phase signal;

producing a servo reference signal synchronized with said stable reference signal; and controlling the rotational phase of said rotary drum such that its drum phase signal coincides with said servo reference signal.

14. The video signal processing apparatus according to claim 1, wherein said video signal processing means comprises crosstalk elimination means for eliminating crosstalk in said color signal such that said predetermined delay is introduced in said color signal.

15. The method according to claim 11, wherein the step of processing one of said luminance signal and said color signal comprises eliminating crosstalk in said color signal such that said predetermined delay is introduced in said color signal.

* * * * *